US010079913B2

(12) United States Patent
Feng et al.

(10) Patent No.: US 10,079,913 B2
(45) Date of Patent: Sep. 18, 2018

(54) TRANSMISSION METHOD, TERMINAL AND SYSTEM FOR APPLICATION SOFTWARE

(71) Applicant: ZTE CORPORATION, Shenzhen, Guangdong Province (CN)

(72) Inventors: Changbao Feng, Shenzhen (CN); Yong Liu, Shenzhen (CN); Jiaming Zhang, Shenzhen (CN); Ye Zhu, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 122 days.

(21) Appl. No.: 14/901,898

(22) PCT Filed: Aug. 28, 2013

(86) PCT No.: PCT/CN2013/082500
§ 371 (c)(1),
(2) Date: Dec. 29, 2015

(87) PCT Pub. No.: WO2014/161266
PCT Pub. Date: Oct. 9, 2014

(65) Prior Publication Data
US 2016/0241675 A1 Aug. 18, 2016

(30) Foreign Application Priority Data
Jul. 1, 2013 (CN) .......................... 2013 1 0272325

(51) Int. Cl.
H04W 4/00 (2018.01)
H04L 29/08 (2006.01)
(Continued)

(52) U.S. Cl.
CPC .......... H04L 67/34 (2013.01); H04M 1/7253 (2013.01); H04M 1/72525 (2013.01);
(Continued)

(58) Field of Classification Search
CPC ...... H04L 67/34; H04W 76/02; H04W 76/06; H04W 4/001; H04W 4/50; H04W 76/10;
(Continued)

(56) References Cited

U.S. PATENT DOCUMENTS

2003/0153300 A1* 8/2003 Nakao .................. H04W 12/06
455/410
2009/0180449 A1 7/2009 Maki
2012/0072528 A1* 3/2012 Rimac .............. H04N 21/41407
709/217

FOREIGN PATENT DOCUMENTS

CN 102572832 A 7/2012
CN 102883449 1/2013
(Continued)

OTHER PUBLICATIONS

International Search Report (Form PCT/ISA/210) for International Application No. PCT/CN2013/082500 dated Apr. 3, 2014.
(Continued)

Primary Examiner — Kan Yuen
(74) Attorney, Agent, or Firm — Koppel, Patrick, Heybl & Philpott

(57) ABSTRACT

Provided are a transmission method, terminal and system for application software. In the method, a first terminal creates a wireless hotspot; a second terminal joins a wireless network constructed by the wireless hotspot when joining request information sent by the second terminal is received; and interaction of application software with the second terminal is performed based on the wireless network. By the technical solution, the application software may be shared among these terminals, and the users do not have to download the application software from the network so as to save the data consumption of the users. Moreover, downloaded application software may also be shared among these terminals through application store clients on the terminals, so
(Continued)

as to improve enthusiasm of the user in searching for and downloading the application software and facilitate popularization of the application store clients as well as the application software thereof.

6 Claims, 4 Drawing Sheets

(51) Int. Cl.
*H04W 76/10* (2018.01)
*H04W 76/30* (2018.01)
*H04W 4/50* (2018.01)
*H04W 84/12* (2009.01)
*H04M 1/725* (2006.01)
*H04W 76/02* (2009.01)
*H04W 76/06* (2009.01)
*G06F 9/445* (2018.01)

(52) U.S. Cl.
CPC ............. *H04W 4/001* (2013.01); *H04W 4/50* (2018.02); *H04W 76/02* (2013.01); *H04W 76/06* (2013.01); *H04W 76/10* (2018.02); *H04W 76/30* (2018.02); *H04W 84/12* (2013.01); *G06F 9/44563* (2013.01)

(58) Field of Classification Search
CPC ... H04W 76/30; H04W 84/12; G06F 9/44563; H04M 1/72525; H04M 1/7253
USPC .................................................. 370/310–350
See application file for complete search history.

(56) References Cited

FOREIGN PATENT DOCUMENTS

CN 102932958 A 2/2013
CN 103118171 A 5/2013

OTHER PUBLICATIONS

Anonymous: "Shan Chuan official website", Jun. 6, 2013, retrieved from the Internet: URL: http://web.archive.org/web/20130606034317/ http://www.flashtransfer.cn (retrieved May 11, 2016).
Anonymous: "Xender—Wikipedia, the free encyclopedia", May 26, 2015, retrieved from the Internet: URL: https://web.archive.org/ web/20150526015718/http://en.wikipedia.org/wiki/Xender (retrieved May 11, 2016).
Naveen Robsworth: "Xender: The Fastest Data Transfer App for Android", Nov. 5, 2014, retrieved from the Internet: URL: http:// www.droidviews.com/xender-fastest-data-transfer-app-android/, retrieved May 10, 2016.
Supplementary European Search Report, Application No. EP13880798, completed May 11, 2016.

\* cited by examiner

TRANSMISSION METHOD, TERMINAL AND SYSTEM FOR APPLICATION SOFTWARE

TECHNICAL FIELD

The present disclosure relates to the technical field of communication, and in particular to a transmission method, terminal and system for application software.

BACKGROUND

In recent years, with the developing trend of making the mobile phone smarter, having larger screen and higher resolution, consequently, the size of application software of smart phone is becoming larger. There exists abundant application software for smart mobile phones, and users may often search for and download, according to their needs or favours, various kinds of application software through mobile phone networks, which may easily consume dozens of megabits data. Moreover, the downloading speed is so low, which greatly reduces user experiences. In addition, when a user browses and downloads application software through an application store client, data consumption in browsing and downloading of the application software is huge, and the downloaded application software cannot be shared as well, therefore there is no good for popularization of the application store client as well as the application software, meanwhile, the enthusiasm of the user in searching for and downloading the application software is reduced.

For the above-mentioned problems, there is yet no effective solution.

SUMMARY

The embodiments of the present disclosure provide a transmission method, terminal and system for application software, so as to transmit the application software under the condition which can maximally save the user traffic.

In order to achieve the said purpose, an embodiment of the present disclosure provides a transmission method for application software. According to the method, a first terminal creates a wireless hotspot; a second terminal joins a wireless network constructed by the wireless hotspot when joining request information sent by the second terminal is received; and interaction of application software with the second terminal is performed based on the wireless network.

In an example embodiment, the step that the second terminal joins the wireless network constructed by the wireless hotspot when the joining request information sent by the second terminal is received may include: the joining request information sent by the second terminal is verified; the second terminal joins the wireless network constructed by the wireless hotspot when the joining request information is verified successfully; and user information of the second terminal is acquired through the wireless network.

In an example embodiment, the step that the interaction of the application software with the second terminal is performed based on the wireless network may include: application software needing to be transmitted is selected, first reception request information is sent to the second terminal, and the selected application software is sent to the second terminal through the wireless network when first confirmation information sent by the second terminal is received; or, second reception request information sent by the second terminal is received, second confirmation information is sent to the second terminal according to the second reception request information, and the application software selected and sent by the second terminal is received.

In an example embodiment, the method may further include: the second terminal is deleted from the wireless network.

An embodiment of the present disclosure further provides a transmission terminal for application software. The terminal includes: a creating component, configured to create a wireless hotspot; a receiving and joining enablement component, configured to enable a second terminal to join a wireless network constructed by the wireless hotspot when joining request information sent by the second terminal is received; and an interaction component, configured to perform interaction of application software with the second terminal based on the wireless network.

In an example embodiment, the receiving and joining enablement component may include: a verification element, configured to verify the joining request information sent by the second terminal; a joining element, configured to enable the second terminal to join the wireless network constructed by the wireless hotspot when the joining request information is verified successfully; and an acquisition element, configured to acquire user information of the second terminal through the wireless network.

In an example embodiment, the interaction component may be configured to: select application software needing to be transmitted, send first reception request information to the second terminal, and send the selected application software to the second terminal through the wireless network when first confirmation information sent by the second terminal is received; or, receive second reception request information sent by the second terminal, send second confirmation information to the second terminal according to the second reception request information, and receive the application software selected and sent by the second terminal.

In an example embodiment, the transmission terminal may further include: a deletion component, configured to delete the second terminal from the wireless network.

An embodiment of the present disclosure further provides a transmission system for application software. The system includes: a first terminal and one or more second terminals, wherein the first terminal may be configured to create a wireless hotspot, enable the one or more second terminals to join a wireless network constructed by the wireless hotspot when joining request information sent by the one or more second terminals is received, and perform interaction of application software with the one or more second terminals based on the wireless network; and the one or more second terminals may be configured to search for the wireless hotspot created by the first terminal, send the joining request information to the first terminal when the wireless hotspot created by the first terminal is found, and perform interaction of application software with the first terminal based on the wireless network constructed by the wireless hotspot.

In an example embodiment, the one or more second terminals may be further configured to: perform interaction of application software with each other based on the wireless network.

According to the transmission method, terminal and system for the application software in the embodiments of the present disclosure, one terminal creates the wireless hotspot by using a wireless function, one or more other terminals join the wireless network constructed by the wireless hotspot by searching for the created wireless hotspot, and interaction of application software is performed among the terminals based on the wireless network. In this way, the application software may be shared among these terminals, and the users do not have to download the application software from the network so as to save the data consumption of the users. Moreover, downloaded application software may also be shared among these terminals through application store clients on the terminals, so as to improve enthusiasm of the user in searching for and downloading the application software and facilitate popularization of the application store clients as well as the application software thereof.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The technical solution of the embodiments of the present disclosure is mainly implemented as follows: one terminal creates a wireless hotspot by using a wireless function, one or more other terminals join a wireless network constructed by the wireless hotspot by searching for the created wireless hotspot, and interaction of application software is performed among the terminals based on the wireless network. In this way, the application software is shared among the terminals and the users do not have to download the application software from the network.

Figure 1:
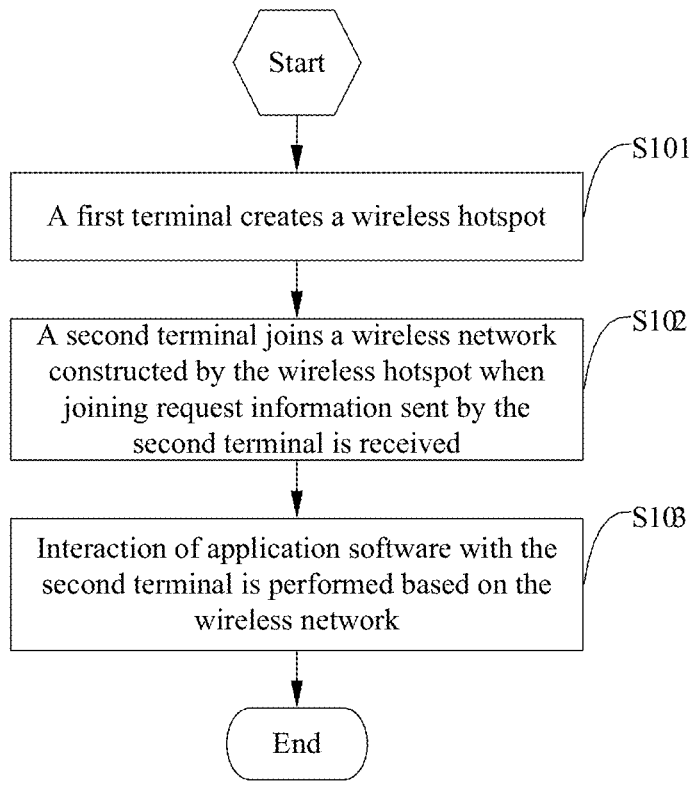
FIG. 1 is a flowchart of a transmission method for application software according to a first embodiment of the present disclosure.

FIG. 1 is a flowchart of a transmission method for application software according to an embodiment of the present disclosure. As shown in FIG. 1, a first embodiment of the present disclosure provides a transmission method for application software, which includes:

Step S101: a first terminal creates a wireless hotspot;

Step S102: a second terminal joins a wireless network constructed by the wireless hotspot when joining request information sent by the second terminal is received;

Step S103: interaction of application software with the second terminal is performed based on the wireless network.

By the steps, the first terminal creates the wireless hotspot by using a wireless function. After the wireless hotspot is created, one or more other terminals may search for the created wireless hotspot through an enabled wireless function, and the first terminal is in a state of waiting for the one or more other terminals to request for connection with the wireless hotspot.

In Step S102, the second terminal joins the wireless network constructed by the wireless hotspot after the joining request information sent by the second terminal is received.

When the joining request information sent by the second terminal is received, the joining request information sent by the second terminal is verified, including verification of identification information such as a user identity of the second terminal. The joining request information is accepted when the user of the second terminal is verified, according to the identification information, to be a user the first terminal is waiting for, and the second terminal is enabled to join the wireless network constructed by the wireless hotspot. Communication is conducted with the second terminal through the wireless network to acquire user information, including a username and a picture, of the second terminal so as to better identify the second terminal in the wireless network.

When the second terminal sends the joining request information, the joining request information is required to be verified, so as to avoid the risk of letting an unknown user or an illegal user directly join the wireless network constructed by the wireless hotspot, and improve the security of the wireless network constructed by the wireless hotspot.

In Step S103, interaction of application software with the second terminal is performed based on the wireless network.

The first terminal may send the application software to the second terminal based on the wireless network in the following manner: the application software needing to be transmitted is selected on the first terminal, then first reception request information is sent to the second terminal, and the selected application software is sent to the second terminal through the wireless network when first confirmation information returned by the second terminal is received. As an example embodiment, the selected application software may be transmitted to the second terminal upon detecting, by using a gravity sensing function of the mobile phone, a shake of the mobile phone, or upon detecting a direct operation on a screen, so that transmission manners are more diversified.

The first terminal may receive the application software sent by the second terminal based on the wireless network in the following manner: second reception request information sent by the second terminal is received, second confirmation information is sent to the second terminal when the application software to be sent is confirmed to be application software needed by the first terminal, the application software selected and sent by the second terminal is received, and a transmission progress of the application software is recorded and displayed in the receiving process.

In an interaction process of the application software, before the terminal receives the application software, the application software is transmitted only after the confirmation information of the terminal is received, so that the terminal is prevented from receiving undesired application software In this way, a right on whether to receive the application software is provided to the user. Further, the user is prevented from receiving an unknown dangerous file, therefore, the security of the user is improved.

Figure 2:
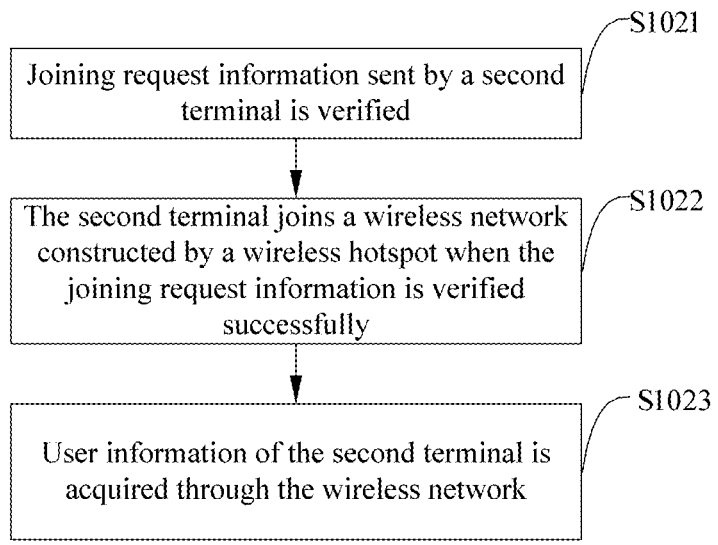
FIG. 2 is a flowchart of a wireless network joining procedure according to a first embodiment of the present disclosure.

FIG. 2 is a flowchart of a wireless network joining procedure according to an embodiment of the present disclosure. As shown in FIG. 2, Step S102 may include:

Step S1021: the joining request information sent by the second terminal is verified;

Step S1022: the second terminal joins the wireless network constructed by the wireless hotspot when the joining request information is verified successfully;

Step S1023: the user information of the second terminal is acquired through the wireless network.

Along with rapid development of mobile phones, each mainstream smart mobile phone has wireless function and gravity sensing function at present. In the embodiment, one terminal creates the wireless hotspot by using the wireless function, one or more other terminals join the wireless network constructed by the wireless hotspot by searching for the created wireless hotspot, and interaction of application software is performed among the terminals based on the wireless network. In this way, the application software may be shared among the terminals and the users do not have to download the application software from the network so as to save the data consumption of the users.

Figure 3:
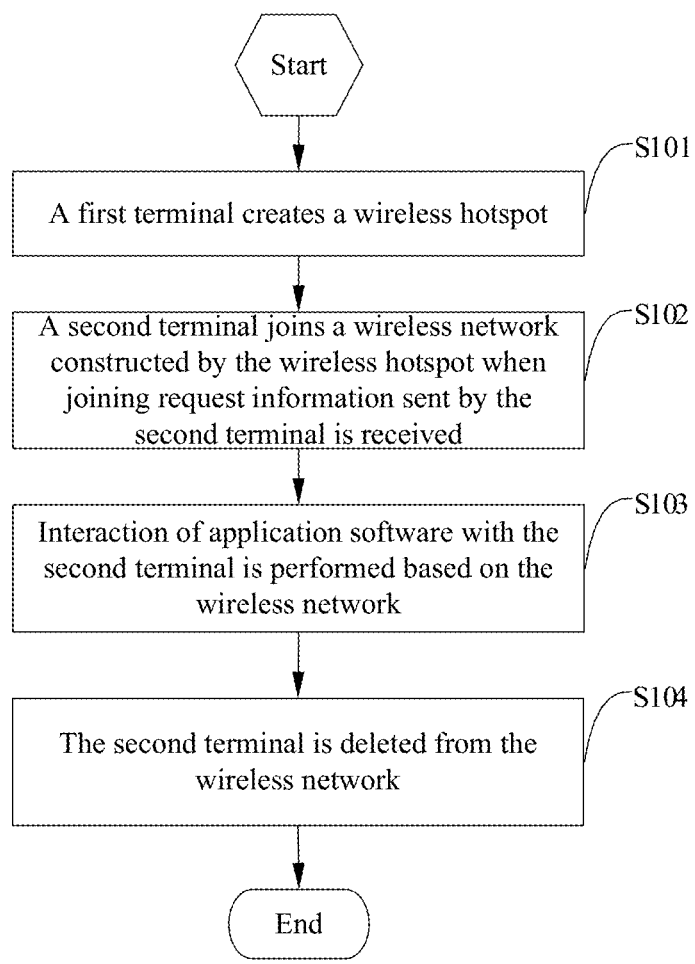
FIG. 3 is a flowchart of a transmission method for application software according to a second embodiment of the present disclosure.

FIG. 3 is a flowchart of a transmission method for application software according to an embodiment of the present disclosure. As shown in FIG. 3, a second embodiment of the present disclosure further provides a transmission method for application software. On the basis of the first embodiment, after Step S103, the method may further include:

Step S104: the second terminal is deleted from the wireless network.

A difference between the embodiment and the first embodiment is that the embodiment further includes operation of deleting the second terminal from the wireless network.

During practical application, for the second terminal which has joined the wireless network constructed by the wireless hotspot, the second terminal may be directly deleted from the wireless network when the user wants to forcibly remove the second terminal from the wireless network, so that the user can manage the terminals in the wireless network more conveniently, and an unnecessary terminal or a terminal which has finished interaction may be deleted from the wireless network. Alternatively, when the second terminal finishes interaction with the first terminal or does not need to interact with the first terminal, the second terminal may initiatively quit the wireless network, so as to achieve higher convenience and flexibility.

The embodiment further provides a transmission terminal for application software, which is configured to implement the method. Components in the transmission terminal may be implemented in a processor. For example, the processor includes a creating component 401, a receiving and joining enablement component 402 and an interaction component 403. These components may be implemented by software, and for example, the software includes a creating component 401, a receiving and joining enablement component 402 and an interaction component 403, and the software may also be stored in a computer-readable medium.

Figure 4:
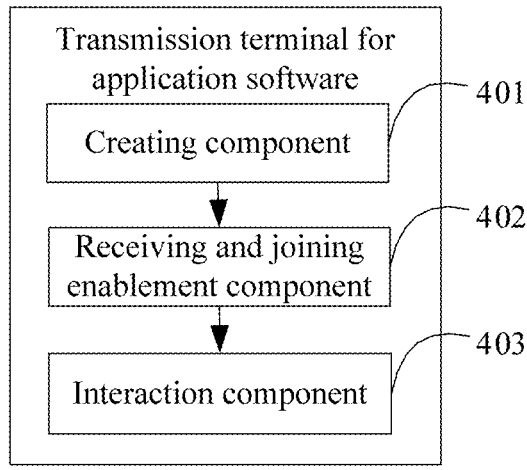
FIG. 4 is a structure diagram of a transmission terminal for application software according to a first embodiment of the present disclosure.

FIG. 4 is a structure diagram of a transmission terminal for application software according to an embodiment of the present disclosure. As shown in FIG. 4, the first embodiment of the present disclosure provides a transmission terminal for application software, which includes: a creating component 401, a receiving and joining enablement component 402 and an interaction component 403.

The creating component 401 is configured to create a wireless hotspot.

A first terminal creates the wireless hotspot by using a wireless function, and after the wireless hotspot is created, one or more other terminals may search for the created wireless hotspot through an enabled wireless function, and the first terminal is in a state of waiting for the one or more other terminals to request for connection with the wireless hotspot.

The receiving and joining enablement component 402 is configured to enable a second terminal to join a wireless network constructed by the wireless hotspot when joining request information sent by the second terminal is received.

When the joining request information sent by the second terminal is received, the joining request information sent by the second terminal is verified, including verification of identification information such as a user identity of the second terminal. The joining request information is accepted when the user of the second terminal is verified, according to the identification information, to be a user the first terminal is waiting for, and the second terminal is enabled to join the wireless network constructed by the wireless hotspot. Communication is conducted with the second terminal through the wireless network to acquire user information, including a username and a picture, of the second terminal so as to better identify the second terminal in the wireless network.

When the second terminal sends the joining request information, the joining request information is required to be verified, so as to avoid the risk of letting an unknown user or an illegal user directly join the wireless network constructed by the wireless hotspot, and improve the security of the wireless network constructed by the wireless hotspot.

The interaction component 403 is configured to perform interaction of application software with the second terminal based on the wireless network.

The first terminal may send the application software to the second terminal based on the wireless network in the following manner: the application software needing to be transmitted is selected on the first terminal, then first reception request information is sent to the second terminal, and the selected application software is sent to the second terminal through the wireless network when first confirmation information returned by the second terminal is received. As an example embodiment, the selected application software may be transmitted to the second terminal upon detecting, by using a gravity sensing function of the mobile phone, a shake of the mobile phone, or upon detecting a direct operation on a screen, so that transmission manners are more diversified.

The first terminal may receive the application software sent by the second terminal based on the wireless network in the following manner: second reception request information sent by the second terminal is received, second confirmation information is sent to the second terminal when the application software to be sent is confirmed to be application software needed by the first terminal, the application software selected and sent by the second terminal is received, and a transmission progress of the application software is recorded and displayed in the receiving process.

In an interaction process of the application software, before the terminal receives the application software, the application software is transmitted only after the confirmation information of the terminal is received, so that the terminal is prevented from receiving undesired application software In this way, a right on whether to receive the application software is provided to the user. Further, the user is prevented from receiving an unknown dangerous file, therefore, the security of the user is improved.

Figure 5:
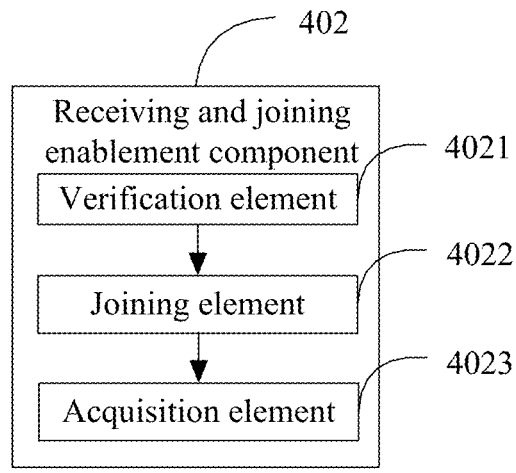
FIG. 5 is a structure diagram of a receiving and joining enablement component according to a first embodiment of the present disclosure.

FIG. 5 is a structure diagram of a receiving and joining enablement component according to an embodiment of the present disclosure. As shown in FIG. 5, the receiving and joining enablement component 502 may include: a verification element 4021, a joining element 4022 and an acquisition element 4023, wherein the verification element 4021 is configured to verify the joining request information sent by the second terminal;

the joining element 4022 is configured to enable the second terminal to join the wireless network constructed by the wireless hotspot when the joining request information is verified successfully; and the acquisition element 4023 is configured to acquire user information of the second terminal through the wireless network.

Along with rapid development of mobile phones, each mainstream smart mobile phone has wireless function and gravity sensing function at present. In the embodiment, one terminal creates the wireless hotspot by using the wireless function, one or more other terminals join the wireless network constructed by the wireless hotspot by searching for the created wireless hotspot, and interaction of application software is performed among the terminals based on the wireless network. In this way, the application software may be shared among the terminals and the users do not have to download the application software from the network so as to save the data consumption of the users.

In addition, in the embodiment, the wireless hotspot may also be created by using the wireless function through an application store client on the terminal. One or more other terminals may also join the wireless network constructed by the wireless hotspot by searching the created wireless hotspot through their respective application store clients. The interaction of application software may be performed among the application store clients based on the wireless network. In this way, the application software can be shared among these terminals, so as to improve enthusiasm of the user in searching for and downloading the application software, and facilitate popularization of the application store clients as well as the application software thereof.

Figure 6:
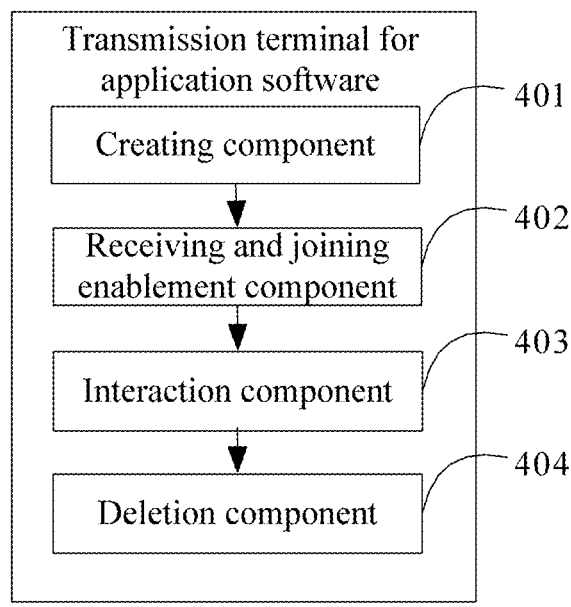
FIG. 6 is a structure diagram of a transmission terminal for application software according to a second embodiment of the present disclosure.

FIG. 6 is a structure diagram of a transmission terminal for application software according to an embodiment of the present disclosure. As shown in FIG. 6, the second embodiment of the present disclosure further provides a transmission terminal for application software. On the basis of the first embodiment, after the interaction component 403, the transmission terminal may further include:

a deletion component 404, configured to delete the second terminal from the wireless network.

A difference between the embodiment and the first embodiment is that the embodiment further includes operation of deleting the second terminal from the wireless network.

During practical application, for the second terminal which has joined the wireless network constructed by the wireless hotspot, the second terminal may be directly deleted from the wireless network when the user wants to forcibly remove the second terminal from the wireless network, so that the user can manage the terminals in the wireless network more conveniently, and an unnecessary terminal or a terminal which has finished interaction may be deleted from the wireless network. Alternatively, when the second terminal finishes interaction with the first terminal or does not need to interact with the first terminal, the second terminal may initiatively quit the wireless network, so as to achieve higher convenience and flexibility.

Figure 7:
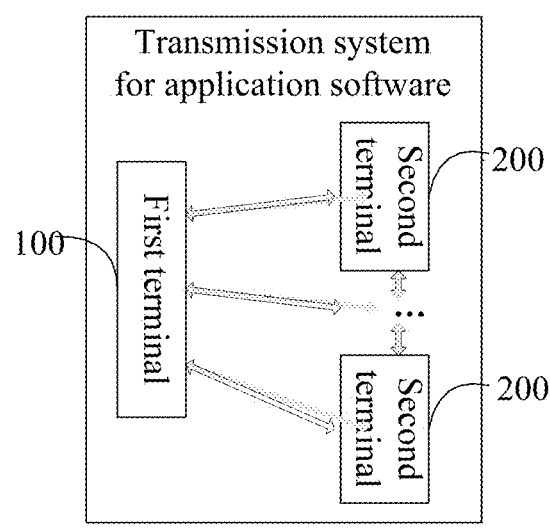
FIG. 7 is a structure diagram of a transmission system for application software according to an embodiment of the present disclosure.

FIG. 7 is a structure diagram of a transmission system for application software according to an embodiment of the present disclosure. As shown in FIG. 7, the embodiment of the present disclosure further provides a transmission system for application software, which includes: a first terminal 100 and one or more second terminals 200.

The first terminal 100 is configured to create a wireless hotspot, enable the one or more second terminals 200 to join a wireless network constructed by the wireless hotspot when joining request information sent by the one or more second terminals 200 is received, and perform interaction of application software with the one or more second terminals 200 based on the wireless network.

The one or more second terminals 200 are configured to search for the wireless hotspot created by the first terminal 100, send the joining request information to the first terminal 100 when the wireless hotspot created by the first terminal 100 is found, and perform interaction of application software with the first terminal 100 based on the wireless network constructed by the wireless hotspot.

The specific interaction process refers to the abovementioned process, and will not be repeated here. Furthermore, the transmission system for the application software in the embodiment is further configured to: perform interaction of application software among the one or more second terminals 200 based on the wireless network. Therefore, the first terminal 100 and second terminals 200 in the wireless network constructed by the wireless hotspot may perform interaction of application software to implement sharing of the application software.

According to the transmission method, terminal and system for the application software in the embodiments of the present disclosure, one terminal creates the wireless hotspot by using the wireless function, one or more other terminals join the wireless network constructed by the wireless hotspot by searching for the created wireless hotspot, and interaction of application software is performed among the terminals based on the wireless network. In this way, the application software may be shared among these terminals, and the users do not have to download the application software from the network so as to save the data consumption of the users. Moreover, the downloaded application software may also be shared among these terminals through the application store clients on the terminals, so as to improve the enthusiasm of the user in searching for and downloading the application software and facilitate popularization of the application store clients as well as the application software thereof.

INDUSTRIAL APPLICABILITY

The technical solutions of the embodiments of the present disclosure may be applicable to the technical field of communication. One terminal creates a wireless hotspot by using a wireless function, one or more other terminals join a wireless network constructed by the wireless hotspot by searching for the created wireless hotspot, and interaction of application software is performed among the terminals based on the wireless network. In this way, application software may be shared among these terminals, and the users do not have to download the application software from the network so as to save the data consumption of the users. Moreover, downloaded application software may also be shared among these terminals through application store clients on the terminals, so as to improve enthusiasm of the user in searching for and downloading the application software and facilitate popularization of the application store clients as well as the application software thereof.

The above is only the example embodiments of the present disclosure and thus not intended to limit the scope of the present disclosure. Any equivalent structure or flow transformations made by virtue of contents of the specification and drawings of the present disclosure or direct or indirect applications of the contents of the specification and drawings of the present disclosure to the other related technical fields shall fall within the scope of protection defined by the claims of the present disclosure.

What is claimed is:

1. A transmission method for application software, comprising:

creating, by a first terminal, a wireless hotspot;

enabling a second terminal to join a wireless network constructed by the wireless hotspot when joining request information sent by the second terminal is received;

wherein enabling the second terminal to join the wireless network constructed by the wireless hotspot when the joining request information sent by the second terminal is received comprises:

verifying the joining request information sent by the second terminal;

enabling the second terminal to join the wireless network constructed by the wireless hotspot when the joining request information is verified successfully; and acquiring user information of the second terminal through the wireless network; and performing interaction of application software with the second terminal based on the wireless network;

wherein performing the interaction of application software with the second terminal based on the wireless network comprises:

selecting application software needing to be transmitted, sending first reception request information to the second terminal, and sending the selected application software to the second terminal through the wireless network when first confirmation information sent by the second terminal is received; or receiving second reception request information sent by the second terminal, sending second confirmation information to the second terminal according to the second reception request information, and receiving the application software selected and sent by the second terminal.

2. The method as claimed in claim 1, further comprising: deleting the second terminal from the wireless network.

3. A transmission terminal for application software, comprising:

a creating component, configured to create a wireless hotspot;

a receiving and joining enablement component, configured to enable a second terminal to join a wireless network constructed by the wireless hotspot when joining request information sent by the second terminal is received;

wherein the receiving and joining enablement component comprises:

a verification element, configured to verify the joining request information sent by the second terminal;

a joining element, configured to enable the second terminal to join the wireless network constructed by the wireless hotspot when the joining request information is verified successfully; and an acquisition element, configured to acquire user information of the second terminal through the wireless network; and an interaction component, configured to perform interaction of application software with the second terminal based on the wireless network;

wherein the interaction component is configured to:

select application software needing to be transmitted, send first reception request information to the second terminal, and send the selected application software to the second terminal through the wireless network when first confirmation information sent by the second terminal is received; or receive second reception request information sent by the second terminal, send second confirmation information to the second terminal according to the second reception request information, and receive the application software selected and sent by the second terminal.

4. The terminal as claimed in claim 3, further comprising: a deletion component, configured to delete the second terminal from the wireless network.

5. A transmission system for application software, comprising:

a first terminal and one or more second terminals, wherein:

the first terminal is configured to create a wireless hotspot, enable the one or more second terminals to join a wireless network constructed by the wireless hotspot when joining request information sent by the one or more second terminals is received, and perform interaction of application software with the one or more second terminals based on the wireless network; and the one or more second terminals are configured to search for the wireless hotspot created by the first terminal, send the joining request information to the first terminal when the wireless hotspot created by the first terminal is found, and perform interaction of application software with the first terminal based on the wireless network constructed by the wireless hotspot;

wherein the process of the first terminal enabling the one or more second terminals to join a wireless network constructed by the wireless hotspot when joining request information sent by the one or more second terminals is received comprises:

verifying the joining request information sent by the second terminal;

enabling the second terminal to join the wireless network constructed by the wireless hotspot when the joining request information is verified successfully; and acquiring user information of the second terminal through the wireless network; and wherein the process of the first terminal performing interaction of application software with the one or more second terminals based on the wireless network comprises:

selecting application software needing to be transmitted, sending first reception request information to the second terminal, and sending the selected application software to the second terminal through the wireless network when first confirmation information sent by the second terminal is received; or receiving second reception request information sent by the second terminal, sending second confirmation information to the second terminal according to the second reception request information, and receiving the application software selected and sent by the second terminal.

6. The system as claimed in claim 5, wherein the one or more second terminals are further configured to:

perform interaction of application software with each other based on the wireless network.

* * * * *